United States Patent
Evans et al.

(10) Patent No.: US 9,366,152 B2
(45) Date of Patent: *Jun. 14, 2016

(54) APPARATUS AND METHOD FOR CO-GENERATION OF ELECTRICAL ENERGY FROM AN EXTERNAL SOURCE OF FORCED AIR

(71) Applicants: Steven Evans, Deer Park, NY (US); Steven Evans, II, Wyandanch, NY (US); Frank Clark, Deer Park, NY (US)

(72) Inventors: Steven Evans, Deer Park, NY (US); Steven Evans, II, Wyandanch, NY (US); Frank Clark, Deer Park, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/608,628

(22) Filed: Jan. 29, 2015

(65) Prior Publication Data
US 2015/0218960 A1    Aug. 6, 2015

Related U.S. Application Data

(63) Continuation of application No. 13/235,359, filed on Sep. 17, 2011, now Pat. No. 8,963,359.

(60) Provisional application No. 61/394,496, filed on Oct. 19, 2010.

(51) Int. Cl.
| | |
|---|---|
| *F01D 15/10* | (2006.01) |
| *F03D 9/00* | (2016.01) |
| *F01D 1/20* | (2006.01) |
| *F01D 13/02* | (2006.01) |
| *F01D 17/08* | (2006.01) |

(52) U.S. Cl.
CPC ...... *F01D 15/10* (2013.01); *F01D 1/20* (2013.01); *F01D 13/02* (2013.01); *F01D 17/085* (2013.01); *F03D 9/002* (2013.01); *F05B 2220/602* (2013.01); *F05D 2220/62* (2013.01); *Y02B 10/30* (2013.01); *Y02E 10/725* (2013.01)

(58) Field of Classification Search
CPC ....... F01D 13/02; F01D 15/10; F01D 17/085; F01D 1/20; F03D 9/002; F05B 2220/602; F05B 2220/62; Y02E 10/725
See application file for complete search history.

(56) References Cited

U.S. PATENT DOCUMENTS

| | | |
|---|---|---|
| 4,087,927 A | 5/1978 | Basmajian |
| 4,159,426 A | 6/1979 | Staton |
| 5,512,788 A | 4/1996 | Berenda et al. |
| 5,559,379 A | 9/1996 | Voss |
| 6,246,126 B1 | 6/2001 | Van Der Veken et al. |
| 6,365,985 B1 | 4/2002 | Cohen |
| 7,834,477 B2 | 11/2010 | Sheikhrezai |
| 8,183,709 B1 | 5/2012 | Manning |
| 8,884,453 B2 | 11/2014 | Barzilai et al. |
| 8,941,256 B1 * | 1/2015 | Czamara ............... F03D 9/00 290/55 |
| 8,963,359 B2 | 2/2015 | Evans et al. |

(Continued)

*Primary Examiner* — Pedro J Cuevas
*Assistant Examiner* — S. Mikailoff
(74) *Attorney, Agent, or Firm* — Alfred Walker; John F. Vodopia

(57) ABSTRACT

A co-generation apparatus for the generation of electricity from an external source of forced air is described in which the co-generation apparatus comprises a turbine, a generator, a co-generation control unit, and an adjustable standoff. The turbine is connected to the generator for the production of electricity. The generator interface electrically connects the generator to an electrical system. The co-generation control unit is connected to the turbine and generator interface. The forced air drives the turbine. The turbine can be positioned in a turbine housing that receives the forced air. An adjustable standoff is connected to the turbine. The standoff adjusts the position of the turbine relative to the forced air.

12 Claims, 7 Drawing Sheets

(56) References Cited

U.S. PATENT DOCUMENTS

| | | |
|---|---|---|
| 2005/0104379 A1 | 5/2005 | Haskill |
| 2007/0212212 A1 | 9/2007 | Luttenberg |
| 2009/0146425 A1 | 6/2009 | Widiskey |
| 2009/0206611 A1 | 8/2009 | Gilbert |
| 2009/0224556 A1 | 9/2009 | Berenda et al. |
| 2010/0244455 A1 | 9/2010 | Berginc |
| 2015/0162801 A1* | 6/2015 | Czamara .................. F03D 9/00 290/50 |

* cited by examiner

APPARATUS AND METHOD FOR CO-GENERATION OF ELECTRICAL ENERGY FROM AN EXTERNAL SOURCE OF FORCED AIR

CROSS-REFERENCE TO RELATED APPLICATIONS

This application is a continuation of application Ser. No. 13/235,359 filed Sep. 17, 2011, which '359 application claims priority to provisional application 61/394,496 filed Oct. 19, 2010, the disclosures of both which are incorporated by reference herein and made a part of this application. Applicant claims priority under 35 U.S.C. §120 from application Ser. No. 13/235/359 and under 35 U.S.C. 119(e) from provisional application Ser. No. 61/394,496.

FIELD OF THE INVENTION

The present disclosure relates to an apparatus for the generation of electrical energy from an external source of forced air and in particular, to an apparatus that generates electrical energy while minimizing the additional load placed on the external source of forced air.

DESCRIPTION OF THE RELATED ART

Large forced air systems have an advantage for generating "wind" driven electricity in that they run almost continuously and in particular run continuously during peak hot hours and seasons when electrical demand is at its highest. In addition, large forced air systems are scaled for driving large airflow masses with air velocities that commonly exceed twenty (20) miles per hour. As is well known, air stream speed is an important baseline factor for electricity generation using turbines. The airflow for turbine generators has to be at a sufficient minimum velocity to efficiently power the generator. The high-speed airflow of many large forced air systems exceed the minimum air speed required for most generation systems.

Generator systems in-line with air conduits most commonly low speed hot air exhaust systems associated with electronics. These systems have the detraction that any in-line generator system contained within a conduit interrupts the air flow in the conduit and causes an increase in load on the pressure source in order to maintain the proper cooling flow. An apparatus and method for co-generation are needed that can generate electrical power from the externally directed forced air stream of forced air systems without additionally impacting the power demand of those systems. It is a further advantage that when these forced air systems are functioning at high capacity during periods of high demand, the present disclosure provides an apparatus and method to return generated power to the power source of the structure or building, for example, to reduce the load demanded by the structure during the peak period.

SUMMARY OF THE INVENTION

A co-generation apparatus for the generation of electricity from an external source of forced air is described that includes a turbine that is mechanically connected to a generator. The turbine drives the generator and the generator produces electrical energy. A generator interface electrically connects to the generator and to an external electrical system that can include a distribution system of an external structure or electrical storage device. A co-generation control unit is connected to the turbine and generator interface. The external source of forced as defined herein can include the turbine being fixed in position receiving the external forced air flow or alternatively, for example, the turbine moving relative to the ambient air so as to create a source of forced air relative to the turbine.

The external forced air or forced air can be from a source of pressurized air that is located within the external structure. The source of pressurized air can be a common air conditioning or ventilation system associated with a structure that can be an industrial facility, commercial building, smaller structures such as individual homes and movable structures. The co-generation standoff defines a physical separation between the source of pressurized air or pressure source and the turbine. The co-generation apparatus can also includes one or more sensors connected to the control unit. The sensors can measure parameters such as the pressure, temperature and velocity of the airflow at one or more locations that can include in the external structure and/or source of pressurized air as well as outside of external structure. The control unit sensors can also include measuring and/or tracking the parameters of the source of the external forced air.

An adjustable standoff is connected to the turbine and positioned relative to the forced airflow. The standoff adjusts the distance between the turbine and pressure source to reduce the backpressure from the turbine on the pressure source. The turbine is movable into and out of the forced airflow based on the sensor input to the co-generation control unit. The relative movement of the turbine and forced airflow can be automated and driven by sensor input through the cogeneration control unit or manually. The one or more sensors are positioned to detect select parameters of the forced airflow from the pressure source to include to detecting additional parameters of the pressurized air from the external source of pressure before, during and after interfacing with the turbine. The one or more sensors can also be positioned to measure the backpressure on the pressure source from the turbine. The one or more sensors are connected to the co-generation control unit and the co-generation control unit positions the turbine to minimize the backpressure on the pressure source. The sensors can be positioned to detect parameters of the pressurized airflow before, during and after interfacing with the turbine. Additional parameters measured by the sensors can include, but are not limited electrical parameters for the external source of pressurization for the forced airflow such as the amount electrical power load drawn by the external source of pressurized air.

The standoff can move the housing for the turbine relative to the pressure source.

The standoff can also move the turbine relative to the pressure source. The turbine is movable relative to the housing and pressure source to reduce the backpressure on the pressure source. The turbine can be positioned in the housing and the housing can be a conduit that receives the forced air from the source of pressurized air.

BRIEF DESCRIPTION OF THE DRAWINGS

Preferred embodiments of the disclosure are described below with reference to the drawings, wherein like numerals are used to refer to the same or similar elements.

DETAILED DESCRIPTION OF THE INVENTION

Figure 1:
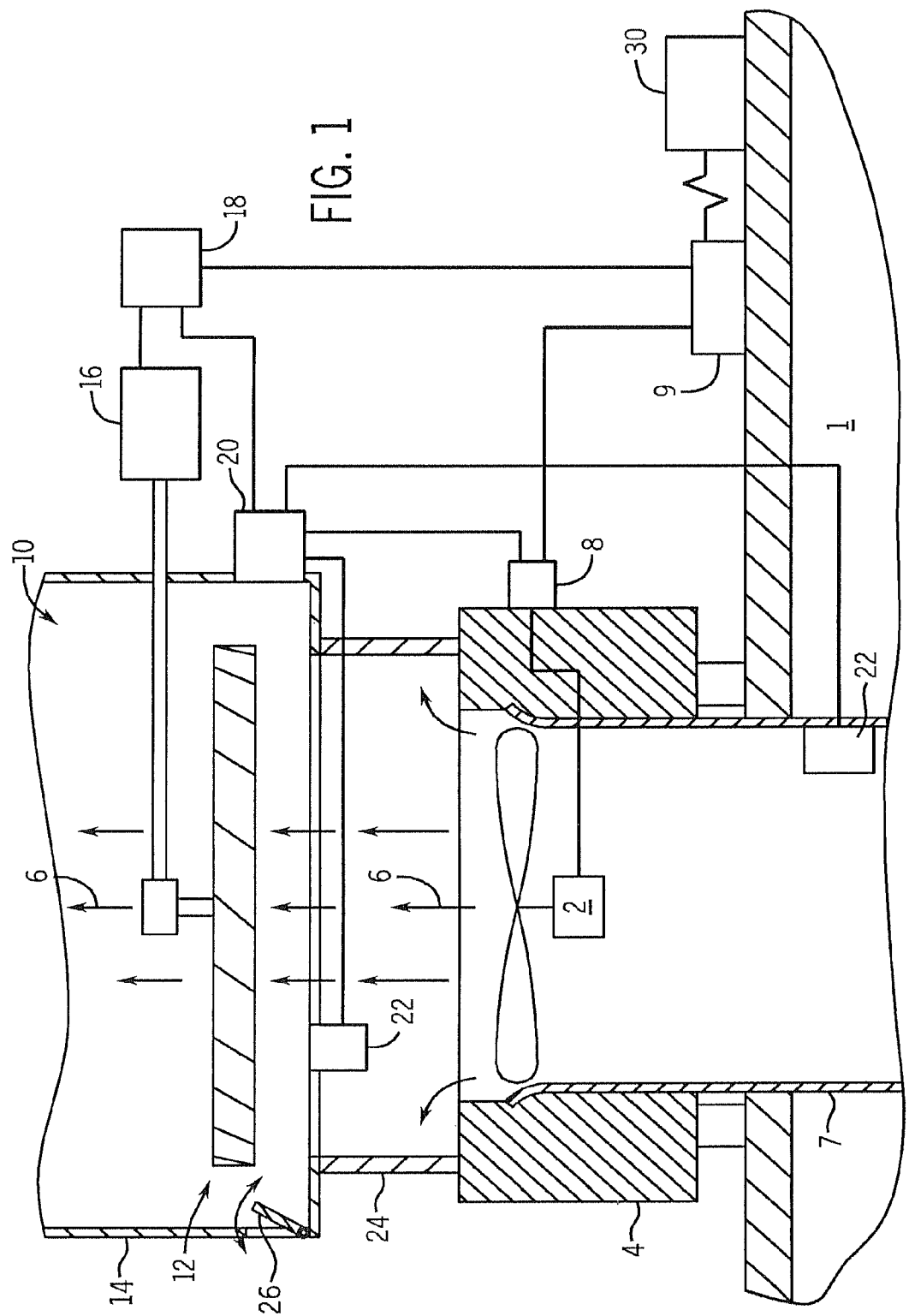
FIG. 1 is an idealized cross-sectional view of a cooling tower type exhaust fan pressure source and a co-generation apparatus positioned for the generation of electrical power from the exhaust of the pressure source.

Initially referring to FIG. 1, an apparatus and a method for co-generation 10 includes a turbine 12, a turbine housing 14, a generator 16, a generator interface 18 and a control unit 20. Turbine 12 drives generator 16 for the production of electricity. The co-generation apparatus 10 is positioned on a structure 1 such as a building and on or in proximity to an external source of air pressure.

As shown, the external source of pressure 2 is positioned in a housing 4. The external source of pressure or pressure source 2 directs a stream of pressurized air 6 through ducts and/or conduits from inside of structure 1 outward into the ambient environment. Pressure source 2 can either draw or push pressurized or forced air stream 6 through co-generation apparatus 10 and drive turbine 12 to generate electricity. In this one preferred embodiment, pressure source 2 is a forced air system such as a fan associated with an air conditioning unit of a large commercial, residential or industrial structure 1. A pressure source control unit 8 provides control inputs to pressure source 2. Structure 1 can further include an electrical distribution system 9. Pressure source control unit 8 is preferably located in or in proximity to structure 1.

Turbine 12 is preferably a multi-bladed propeller with an axis of rotation that is aligned with air stream 6. Turbine 12 has an axis of rotation that is aligned with pressure source 2. Turbine 12 is positioned within a turbine housing 14 that receives the forced airflow 6 from pressure source 2. Turbine 12 is driven by the forced air from pressure source 2 and is mechanically connected to generator 16. The electricity produced by generator 16 is preferably fed into the electrical distribution system 9 of building 1 as standard AC voltage. Alternatively, generator interface 18 can convert the output of generator 16 to DC for storage, for example.

Housing 14 preferably provides a support structure for the different components of co-generation apparatus 10 such as generator 16, generator interface 18 and control unit 20. As a conduit, housing 14 also provides a shield that protects and/or at least partially stabilizes the air stream 6 from the influence of external weather. Turbine housing 14 is connected to pressure source housings 4 by a standoff 24.

Standoff 24 is preferably one or more support columns that are in communication with the ambient air. The amount or distance of standoff 24 between housing 4 and 14 can be a permanent or variable setting of co-generation apparatus 10. For example, co-generation control unit 20 can be constructed to adjustably increase or decrease the distance between housing 4 and housing 14 and/or turbine 12. The adjustment in standoff 24 can be driven by factors such as variations in the flow of pressurized air 6, maximizing power generation, the load on pressure source 2 and/or the backpressure on pressure source 2. In the preferred embodiment, the position of turbine 12 relative to pressure source 2 can be varied using sensors 22 to drive the adjustment of standoffs 24 to position turbine 12 relative to pressure source 2 in air stream 6.

Housing 14 can have any shape to include a uniform diameter tube, a venturi, or an expanding tapered tube. Housing 14 can also include one or more dampers 26 that can draw external air into turbine 12 or alternatively vent air flow 6. The size of dampers 26 can also be varied such that the overall shape of housing 14 can be at least partially altered to selectively direct the air stream 6 from pressure source 2 within housing 14 into turbine 12. Dampers 26 and standoff 24 are connected to and positioned by a control unit 20 of co-generation apparatus 10.

Control unit 20 controls and adjusts the variables of co-generation apparatus 10 that include standoff 24, dampers 26 and the one or more sensors 22 positioned to monitor parameters of co-generation apparatus 10. Control unit 20 can also interface with a pressure source control unit 8 of structure 1 and/or additional sensors 22 positioned to monitor parameters of pressure source 2. Sensors 22 related to pressure source 2 can include the measurement of back pressure on pressure source 2 due to turbine 12, power being drawn by pressure source 2 and other parameters of control unit 8. The connection of source 20 to control unit S can for example continually monitor the power demands of pressure source 2 and adjust the position of standoffs 24 and dampers 26 to reduce the power demand on pressure source 2 and/or maximize the output of generator 16.

Figure 2:
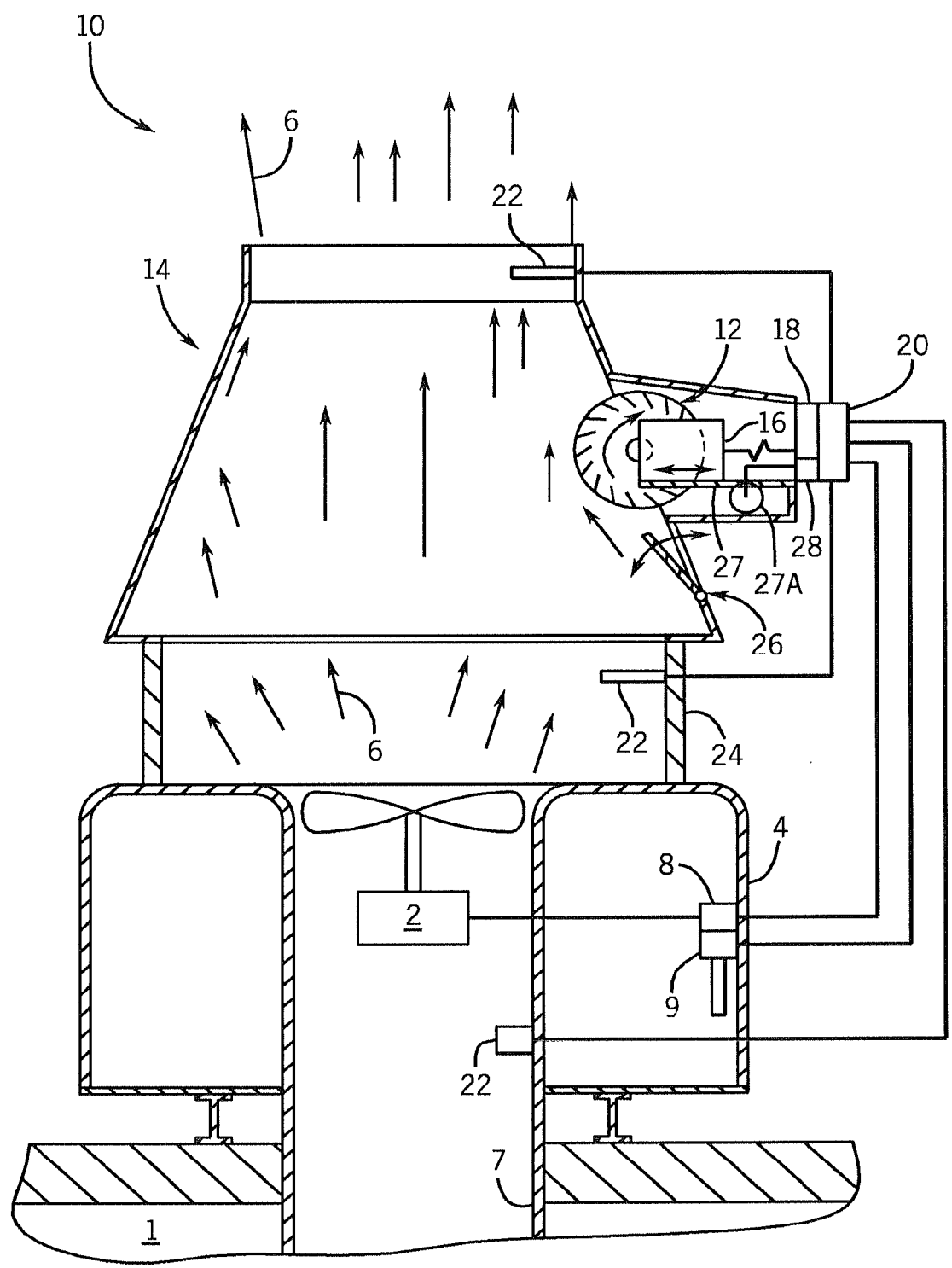
FIG. 2 is the idealized cross-sectional view of the cooling tower exhaust fan of FIG. 1 and an alternative configuration of co-generation apparatus positioned for the generation of power.

Referring now to FIG. 2, turbine 12 can take many different forms to include a centrifugal or paddle wheel type generating arrangement with an axis of rotation approximately perpendicular to air stream 6. It is understood that turbine 12 can have any configuration as described herein to include an inline configuration as shown in FIG. 1 that can be variably position into and from air stream 6.

In this preferred embodiment, housing 14 has a tapered configuration with a venturi effect on air stream 6. Standoffs 24 limit the backpressure on pressure source 2 as described previously. Turbine 12 is positioned on a sled 27 that is adjustably moved into and out of air stream 6 by an electric motor 28. The movement of sled 27 can include roller bearings 27A although it is understood that the movement of sled 27 can be facilitated by any means to include a rail and skid arrangement. Co-generation control unit 20 directs motor 28 to drive the movement of turbine 12 into and out of air stream 6 to selectively increase the force of air stream 6 received by turbine 12 and minimize any increased load on pressure source 2. The control of the position of turbine 12 by control unit 20 is preferably performed automatically based on the monitoring of sensors 22. The movement of turbine 12 can be used to achieve a desired level of electricity generation relative to varying mass flow rates of air stream 6, It is understood that this embodiment can employ multiple turbines 12.

Figure 3:
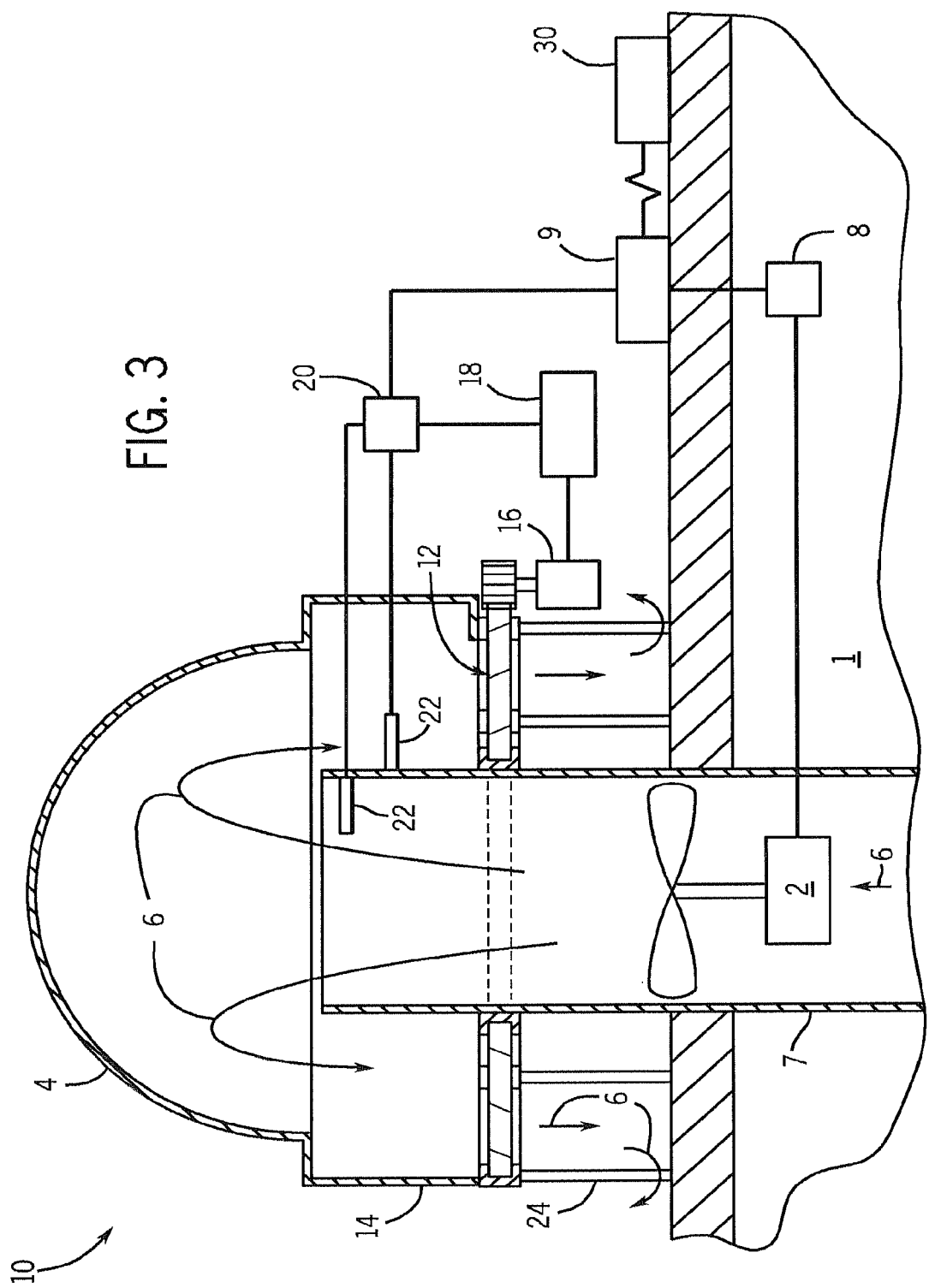
FIG. 3 is an idealized cross-sectional view of a mushroom type exhaust ventilation system and a co-generation apparatus positioned for the generation of electrical power.

As shown in FIG. 3, pressure source 2 includes different forced air flow systems to include, for example, a mushroom type vent housing 4. This type of vent is commonly employed in applications of lower velocity than those associated with larger forced air systems, but in many applications have an almost continuous flow that is more than sufficient to drive turbine 12. In this one preferred embodiment, mushroom type vent housing 4 includes an initial central duct or conduit that redirects air stream 6 approximately one hundred and eighty degrees (180°) and disperses air stream 6 in a radially outward and three hundred sixty degree (360°) direction from the central duct onto an external surface of structure 1. Turbine 12 is preferably constructed as an annular shaped fan positioned external to and after the approximately one hundred and eighty degrees (180°) redirection of air stream 6 and directly aligned with the exhaust of vent housing 4.

Turbine 12 is preferably positioned in housing 14 that is at least partially external to housing 4. Turbine 12 connects to generator 16, generator interface 18, co-generation control unit 20 and distribution system 9 as described previously. Standoff 24 of housing 14 can provide structural supports for turbine 12. Co-generation control unit 20 provides the generated electricity to distribution system 9. Sensors 22 are positioned before and after turbine 12 in order to assess the air stream restriction and/or backpressure load on turbine 12. Pressure source control unit 8 and distribution system 9 can be located in structure 1 or a remote structure. Co-generation control unit 20 functions include those described previously such as the assessment of the power generation and selection for the distribution of the generated electricity to the distribution system for structure 1 and/or conversion to an external battery storage system 30.

Figure 4:
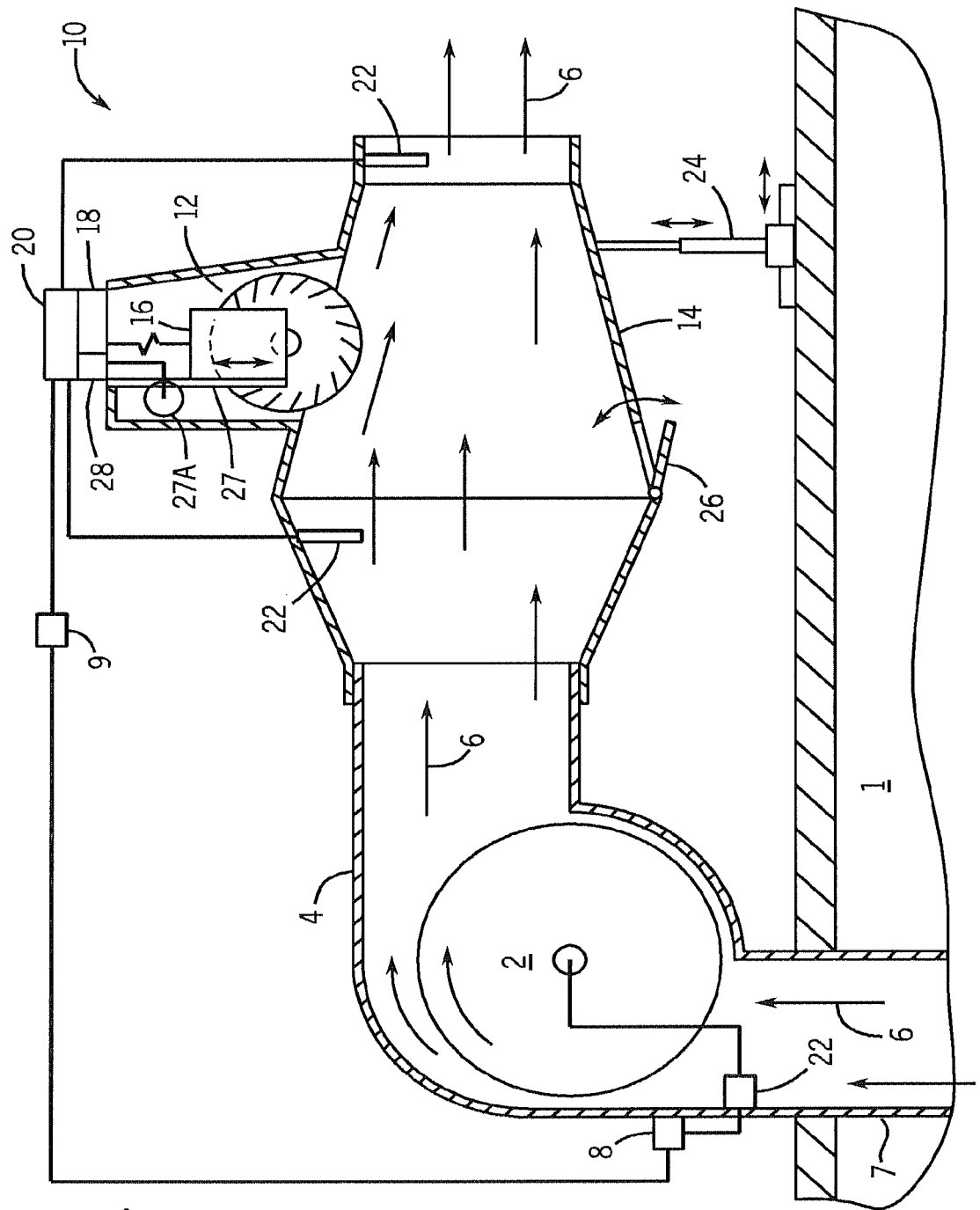
FIG. 4 is an idealized cross-sectional view of a centrifugal ventilation system and a co-generation apparatus positioned for the generation of electrical power.

Referring now to FIG. 4, in this application, pressure source 2 is a centrifugal type blower that exhausts air stream 6 approximately aligned with one of the external surfaces of building 1. Similar to FIG. 2, co-generation apparatus 10 includes a turbine 12, housing 14, generator 16, generator interface 18, co-generation control unit 20 and preferably two or more sensors 22. Housing 14 includes sled 27, roller 27A and motor 28 for the movement of turbine 12 into and out of air stream 6. Turbine 2 is repositionable within air stream 6 to maximize generation capacity and/or to minimize back pressure on pressure source 2.

As described previously, pressure source 2 includes a pressure source housing 4, pressure source control unit 8 and electrical distribution system 9 for building 1. In this preferred embodiment, standoffs 24 adjust housing 4. Standoffs 24 adjust housing 4 longitudinally along structure 1 and in elevation above structure 1. Standoffs 24 adjust housing 4 to direct air stream 6 and thereby accommodate variations in the speed of air stream or forced airflow 6 and adjust turbine 12 to external sources of natural wind and/or other forced airflows 6. Similarly, turbine 12 is positioned on sled 27 that is movable into and out of air stream 6 using electric motor 28 as described previously. Housing 14 can also be adjustable so as to vary the internal diameter or dimensions of housing 14 through the adjustment of the one or more walls of housing 14. Dampers 26 can advantageously contribute to the redirection or reshaping of housing 14 as well as the intake/venting of air stream 6.

Figure 5:
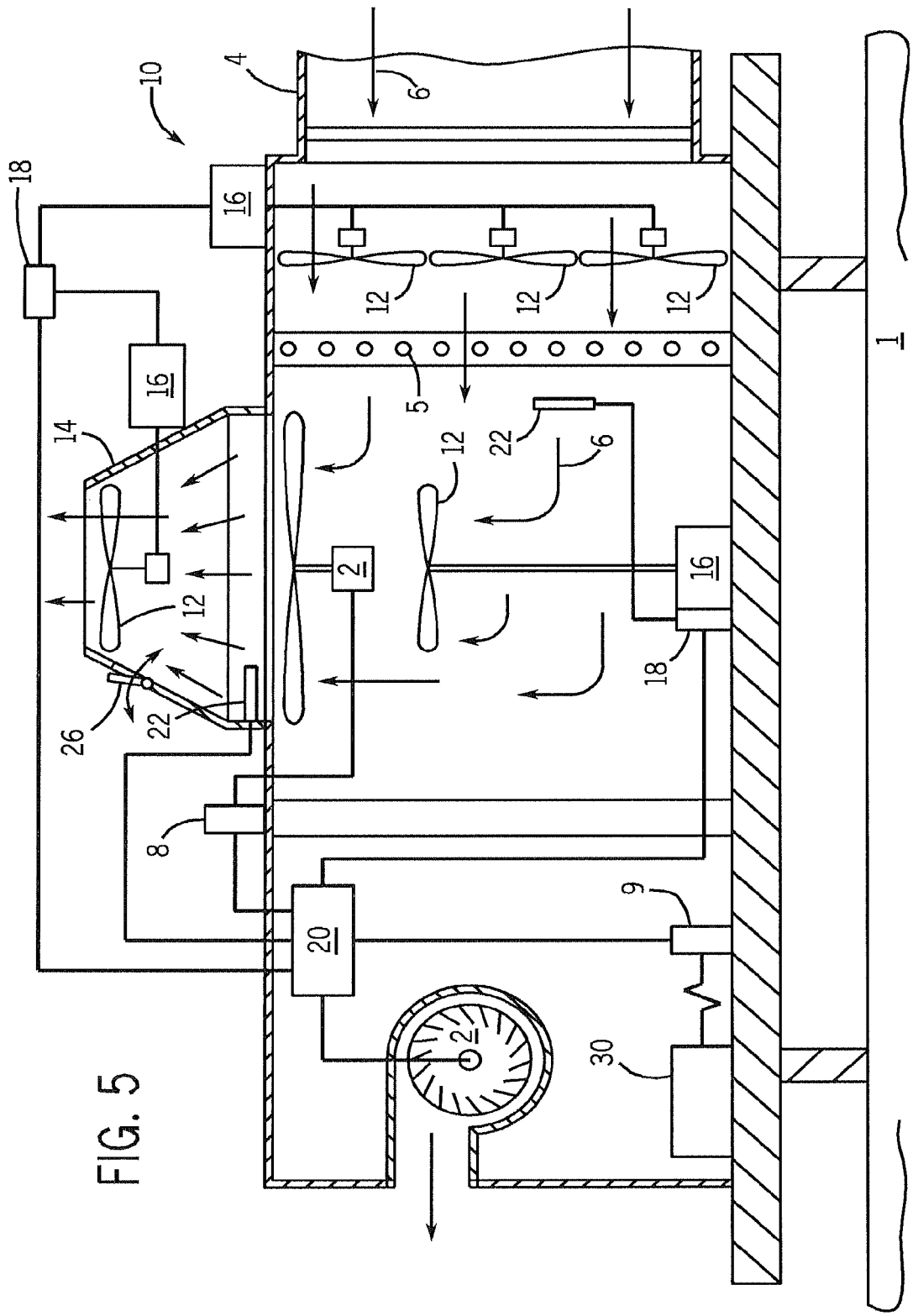
FIG. 5 is an idealized cross-sectional view of another configuration of cooling tower type exhaust fan and a co-generation apparatus positioned for the generation of electrical power.

As shown in FIG. 5, structure 1 co-generation apparatus 10 can also be fluidly coupled to a large air conditioning forced air system driven by pressure source 2 with a return housing 4 that includes coils 5. In this application, two or more turbines 12 are in series in pressurized air stream 6. In this one preferred embodiment, turbines 12 are position on the return air stream 6 before coils 5, after coils 5 and after pressure source 2.

It is understood that cogeneration apparatus 10 can include turbines 12 positioned at any point in the pressurized air flow 6, but that the size, location and quantity of the different turbines are constructed to minimize and control the backpressure on pressure source 2. In addition, while turbines 12 shown in the present embodiment are in-line turbines 2, it is understood that in this application as well as other applications described herein, turbines 2 can be any form of turbine 2 to include a centrifugal type turbine 12.

Figure 6:
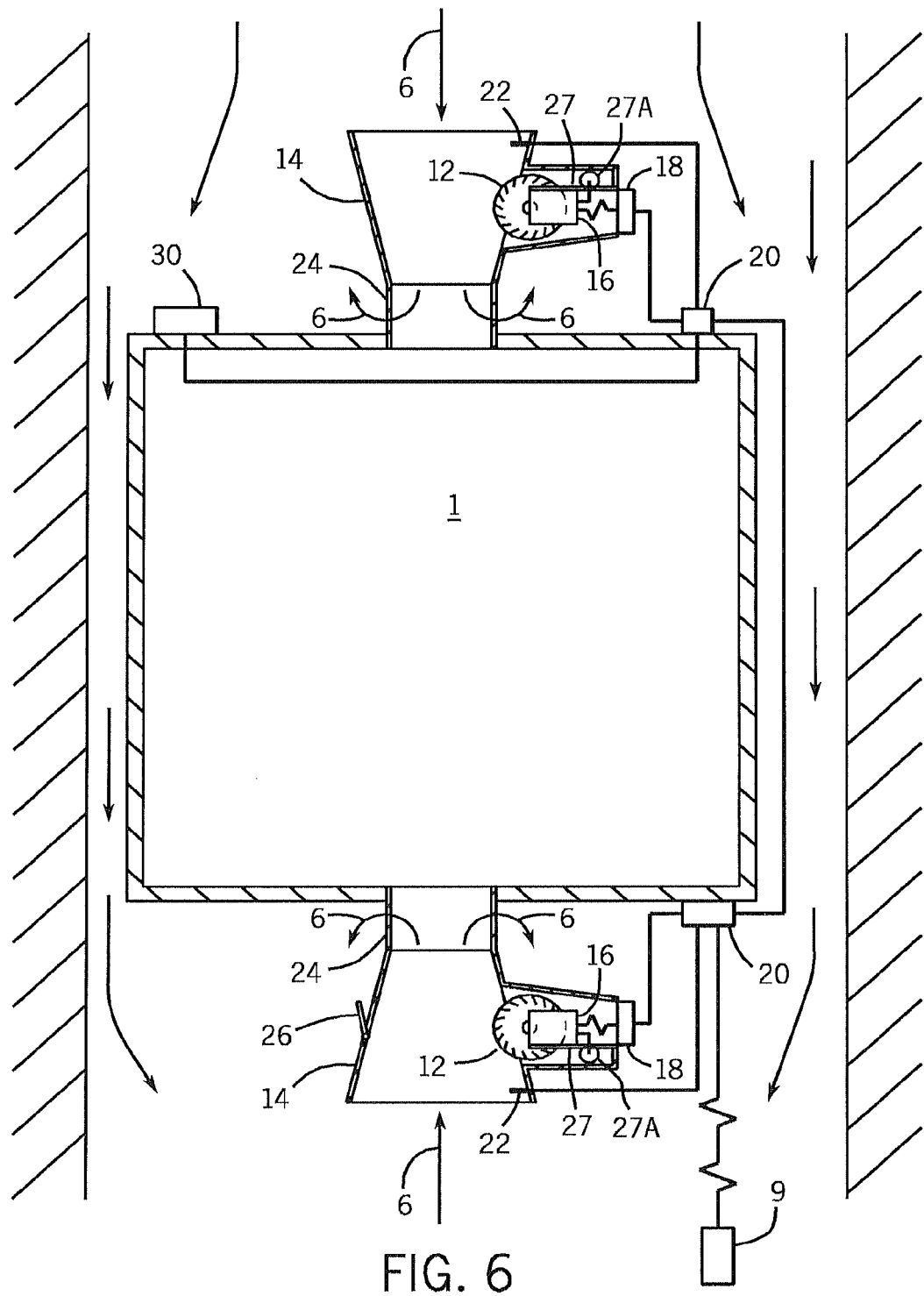
FIG. 6 is an idealized cross-sectional view of a co-generation apparatus positioned for the generation of electrical power on an elevator.

Referring now to FIG. 6, structure 1 in this one preferred embodiment includes an elevator car and cogeneration apparatus 10 is positioned on the top and/or bottom of elevator car 1. The raising and lowering of car 1 in an elevator shaft provides a pressurized source of air 6 that drives turbine 12. Elevator 1 is shown moving upward in this one example with the relative downward movement of pressurized air stream 6. Turbine 12 has a paddle wheel type configuration that includes sled 27, roller 27A and drive motor 28 for movement into and out of pressurized air stream 6. As described previously, turbine 12 is positioned in housing 14 and functions as a conduit for input as well as the directing of the exhaust air from turbine 12. Turbine 12 is connected to generator 16 and generator interface 18 provides the output of generator 16 to distribution system 9. Damper 26 can be selectively employed to draw in additional pressurized air 6 and/or vent excessive pressurized air 6. Standoffs 24 redirect the flow of pressurized 6 out and away from turbine 12 to minimize backpressure.

Figure 7:
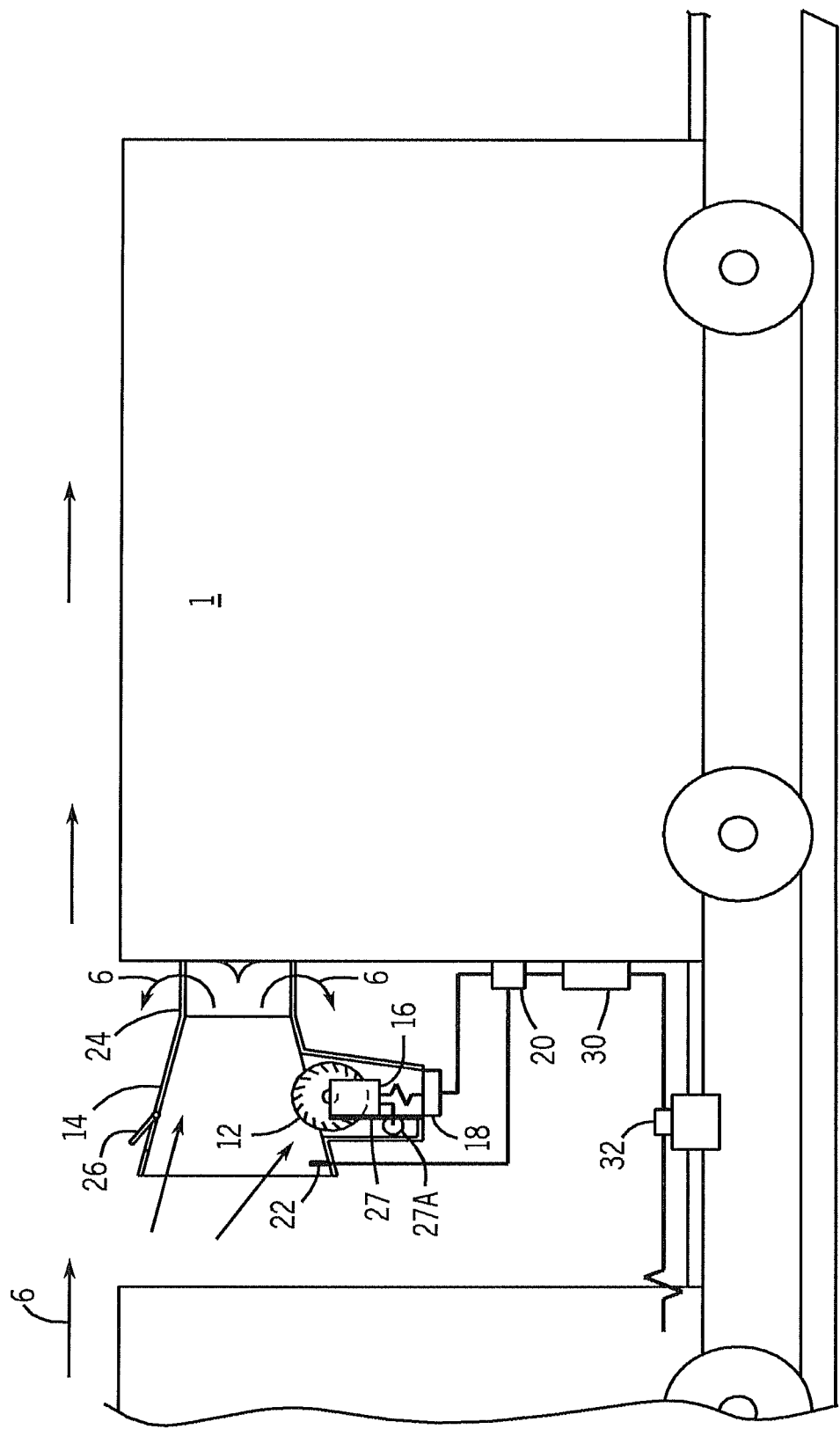
FIG. 7 is an idealized cross-sectional view of a co-generation apparatus positioned on a railway car for the generation of electrical power.

As shown in FIG. 7, co-generation apparatus 10 can also be applied to moving structures 1 such as rail cars, which in many instances have pressurized airflows 6 for extended durations. In this application pressurized air flow 6 is drawn into co-generation apparatus 10 positioned on the front and/or back of a railroad car 1. In this one preferred embodiment, railroad car 1 is a car with an electrical demand such as a refrigerator car 1. Co-generation apparatus 10 includes turbine 12, housing 14, generator 16, generator interface 18 and control unit 20. The electrical output of generator 18 can be stored in battery 30 or utilized to supplement the electrical demand for another car 1. In this application turbine 12 includes sled 27, roller 27A and drive motor 28. Damper 26 can be selectively employed to draw in additional pressurized air 6 and/or vent excessive pressurized air 6. Standoffs 24 redirect the flow of pressurized 6 out and away from turbine 12 to minimize backpressure as described previously.

In the preceding specification, the present disclosure has been described with reference to specific exemplary embodiments thereof. It is understood that the drawings referenced herein are idealized depictions of co-generation apparatus 10. It will be evident, however, that various modifications, combinations and changes may be made thereto without departing from the broader spirit and scope of the invention as set forth in the claims that follow. In addition, though the present invention is described in terms of a series of embodiments, each embodiment of the present invention can combine one or more novel features of the other embodiments. The specification and drawings are accordingly to be regarded in an illustrative manner rather than a restrictive sense.

We claim:

1. A co-generation apparatus for the generation of electricity from forced air flowing through a duct in an external structure, the co-generation apparatus comprises:

at least one turbine comprising an arrangement of turbine blades and mechanically connected to an electrical generator that produces electrical energy;

wherein an external source arranged at a fixed position in the duct generates the forced air flow and wherein the at least one turbine is arranged on an exhaust side of the external source such that the turbine blades are subjected to a portion of the forced air flow;

a sensor positioned in proximity to the external source for sensing a backpressure on the external source created by the turbine blades within the forced air flow;

a generator interface that electrically connects the generator to an electrical distribution system of the external structure;

a co-generation control unit connected to the sensor, the at least one turbine and the generator interface;

an adjustable standoff upon which the at least one turbine is arranged, the adjustable standoff configured to adjust a separation distance between the at least one turbine and the fixed position of the external source in the duct in order that the arrangement of turbine blades in the forced air flow generates negligible or no backpressure on the external source;

wherein the at least one turbine is automatically moved relative to the fixed position of the external source, based on a sensor input of said sensor to the co-generation control unit.

2. The co-generation apparatus of claim 1, wherein the external structure is a building and wherein the separation distance follows a line that is substantially collinear with a direction of the forced air flow.

3. The co-generation apparatus of claim 2, wherein the at least one turbine is provided in a housing and wherein the adjustable standoff moves the housing for the at least one turbine relative to the fixed position of the external source in the duct.

4. The co-generation apparatus of claim 1, further comprising additional sensors respectively positioned to detect a pressure of the forced air flow at said fixed position and at a position of the at least one turbine, said position of the at least one turbine being controlled by the adjustable standoff.

5. The co-generation apparatus of claim 1, wherein upon installation of the co-generation apparatus in the external structure, if a backpressure is detected when the turbine blades are first positioned in the forced air flow, the adjustable standoff is controlled by the co-generation control unit to move the at least one turbine away from the position of the external source to reduce said detected backpressure.

6. The co-generation apparatus of claim 1, wherein said apparatus is installed in a cooling tower.

7. The co-generation apparatus of claim 1, wherein said apparatus is installed in a mushroom type exhaust ventilation system.

8. The co-generation apparatus of claim 1, wherein said apparatus is installed in a centrifugal ventilation system.

9. The co-generation apparatus of claim 1, wherein said at least one turbine is a plurality of turbines.

10. The co-generation apparatus of claim 9, wherein said plurality of turbines are in series in said forced air flow.

11. The co-generation apparatus of claim 1, wherein said apparatus is installed in an elevator.

12. The co-generation apparatus of claim 1, wherein said apparatus is installed in a railway car.

* * * * *